(12) United States Patent
Lee et al.

(10) Patent No.: US 11,100,489 B2
(45) Date of Patent: Aug. 24, 2021

(54) ACCESSING ACCOUNTS AT PAYMENT SYSTEM VIA PHOTOS

(71) Applicant: PAYPAL, INC., San Jose, CA (US)

(72) Inventors: Elliot Michael Lee, San Francisco, CA (US); George Carpenter, V, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 495 days.

(21) Appl. No.: 15/421,160

(22) Filed: Jan. 31, 2017

(65) Prior Publication Data
US 2018/0218355 A1 Aug. 2, 2018

(51) Int. Cl.
| | |
|---|---|
| G06Q 20/32 | (2012.01) |
| G06Q 20/22 | (2012.01) |
| G06Q 20/40 | (2012.01) |
| G06Q 20/10 | (2012.01) |
| G06K 9/00 | (2006.01) |

(52) U.S. Cl.
CPC ..... G06Q 20/3223 (2013.01); G06K 9/00221 (2013.01); G06Q 20/102 (2013.01); G06Q 20/227 (2013.01); G06Q 20/29 (2013.01); G06Q 20/322 (2013.01); G06Q 20/3224 (2013.01); G06Q 20/3274 (2013.01); G06Q 20/3276 (2013.01); G06Q 20/4014 (2013.01)

(58) Field of Classification Search
CPC .... G06Q 20/29; G06Q 20/227; G06Q 20/322; G06Q 20/3274; G06Q 20/3276; G06Q 20/4014; G06Q 20/40145; G06Q 20/3223
USPC .......................................................... 705/21
See application file for complete search history.

(56) References Cited

U.S. PATENT DOCUMENTS

| | | | | |
|---|---|---|---|---|
| 8,577,810 B1 * | 11/2013 | Dalit | ....................... | G06F 21/32 |
| | | | | 705/1.1 |
| 8,861,804 B1 * | 10/2014 | Johnson | .................. | G06F 16/51 |
| | | | | 382/118 |
| 9,202,105 B1 * | 12/2015 | Wang | ................. | G06Q 20/4014 |

(Continued)

OTHER PUBLICATIONS

Clarke, Josie. Paypal rolls out photo payment app. Aug. 9, 2013. Irish Independent. Accessed from https://web.archive.org/web/20130829010705/http://www.independent.ie/business/technology/paypal-rolls-out-photo-payment-app-29485468.html on on Jan. 12, 2019.*

(Continued)

*Primary Examiner* — Elizabeth H Rosen (74) *Attorney, Agent, or Firm* — Haynes and Boone, LLP (57) ABSTRACT

A method of using a device to access multiple payment accounts at a payment system via photos is disclosed. The method includes accessing a photo generated by a first device. The method includes determining first and second images of a first and second person in the photo, respectively. The method includes determining that the first image is associated with a first payment account at the payment system. The method includes, responsive to determining that the first image is associated with the first payment account, determining whether the second image is associated with a second payment account. The method includes, responsive to determining that the second image is associated with the second payment account, authorizing a payment application at the device to split a payment to a third payment account between the first and second payment accounts, or to initiate sending of the payment to the second payment account.

20 Claims, 6 Drawing Sheets

(56) References Cited

U.S. PATENT DOCUMENTS

| | | | |
|---|---|---|---|
| 9,300,678 B1* | 3/2016 | Stack | H04W 12/104 |
| 9,825,943 B2* | 11/2017 | Thompson | G06F 21/31 |
| 2012/0158582 A1* | 6/2012 | Nuzzi | G06Q 20/3276 |
| | | | 705/40 |
| 2013/0173466 A1* | 7/2013 | Lepisto | G06Q 20/386 |
| | | | 705/44 |
| 2013/0218757 A1* | 8/2013 | Ramanathan | G06Q 20/385 |
| | | | 705/39 |
| 2013/0254107 A1* | 9/2013 | McClure | G06Q 40/00 |
| | | | 705/42 |
| 2014/0049653 A1* | 2/2014 | Leonard | H04N 5/44 |
| | | | 348/207.1 |
| 2014/0089195 A1* | 3/2014 | Ward | G06Q 20/223 |
| | | | 705/44 |
| 2014/0258010 A1* | 9/2014 | Mardikar | G06Q 20/202 |
| | | | 705/21 |
| 2015/0356563 A1* | 12/2015 | Vohra | G06Q 20/40145 |
| | | | 705/44 |
| 2016/0125383 A1* | 5/2016 | Chan | G06Q 20/102 |
| | | | 705/39 |
| 2019/0019189 A1* | 1/2019 | Sanders | G06Q 20/409 |

OTHER PUBLICATIONS

Hesseldahl, Arik. Alibaba's Jack Ma Demos Pay-With-Your-Face Technology. Mar. 16, 2015. Recode. Accessed from https://www.recode.net/2015/3/16/11560288/alibabas-jack-ma-demos-pay-with-your-face-technology on Jan. 12, 2019.*

Author unknown. Will MasterCard Really Let Users Pay By 'Selfie'? Oct. 6, 2015. PYMNTS.com. Accessed from https://www.pymnts.com/news/social-commerce/2015/will-mastercard-really-let-users-pay on Jan. 12, 2019.*

Braileanu, Rob. "Split Bills Instantly with Revolut," https://blog.revolut.com/split-bills-instantly-with-revolut/ (Jan. 17, 2017). (Year: 2017).*

* cited by examiner

ACCESSING ACCOUNTS AT PAYMENT SYSTEM VIA PHOTOS

BACKGROUND

Embodiments of the inventive subject matter generally relate to the field of communication systems and, more particularly, to accessing payment system accounts via photos by communicating, via communication systems, to a payment system.

A payment system is a platform that facilitates management and transfer of funds between payment accounts. Each payment account can be associated with a separate user. Each payment account can have a balance of funds. A user can login to the payment account to access his or her financial accounts, manage the payment account, and other functionality. The user can then transfer funds between the multiple financial accounts and/or the payment account. However, in various situations it may be difficult for the user to access his or her payment account. It may also be difficult to easily and conveniently select a recipient payment account for transferring funds from the user's payment account.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to using photos, other types of digital images are contemplated, including videos, and/or 3-dimensional (3-D) images, among others.

Payment systems facilitate management and transfer of funds between payment accounts, where each payment account can be associated with a different user. Each payment account at the payment system can have a balance of funds. A user can sign-up for the payment system to create a new payment account. Once the sign-up is successful, the user can then associate new financial accounts with that payment account. A financial account can be an account at a bank, at a credit card company, or at another financial institution. The payment account can have a separate fund balance from the associated financial institutions. The user can transfer funds between the multiple financial accounts and/or the payment account.

The user can also use his or her user device to generate a photo of him or herself along with one or more other persons. The photo, which can include images of several people, can then be communicated to a payment system. The payment system can determine that an image of a first person is associated with a first payment account, and that an image of a second person is associated with a second payment account. Based on the determination of which payment accounts are associated with the image(s), the payment system can send communication to the user device to cause a user interface of the user device to display a request. The request can be for selecting whether to send a payment to the second payment account, or to split the payment with the second payment account. Based on the selection, the payment system can authorize a payment application on the user device to send the payment to the second payment account from the first payment account, or to split the payment between the first and second payment accounts (e.g., to make a joint payment to a third payment account corresponding to a merchant). The following description and associated Figures illustrate various embodiments directed to the ideas discussed above.

Figure 1:
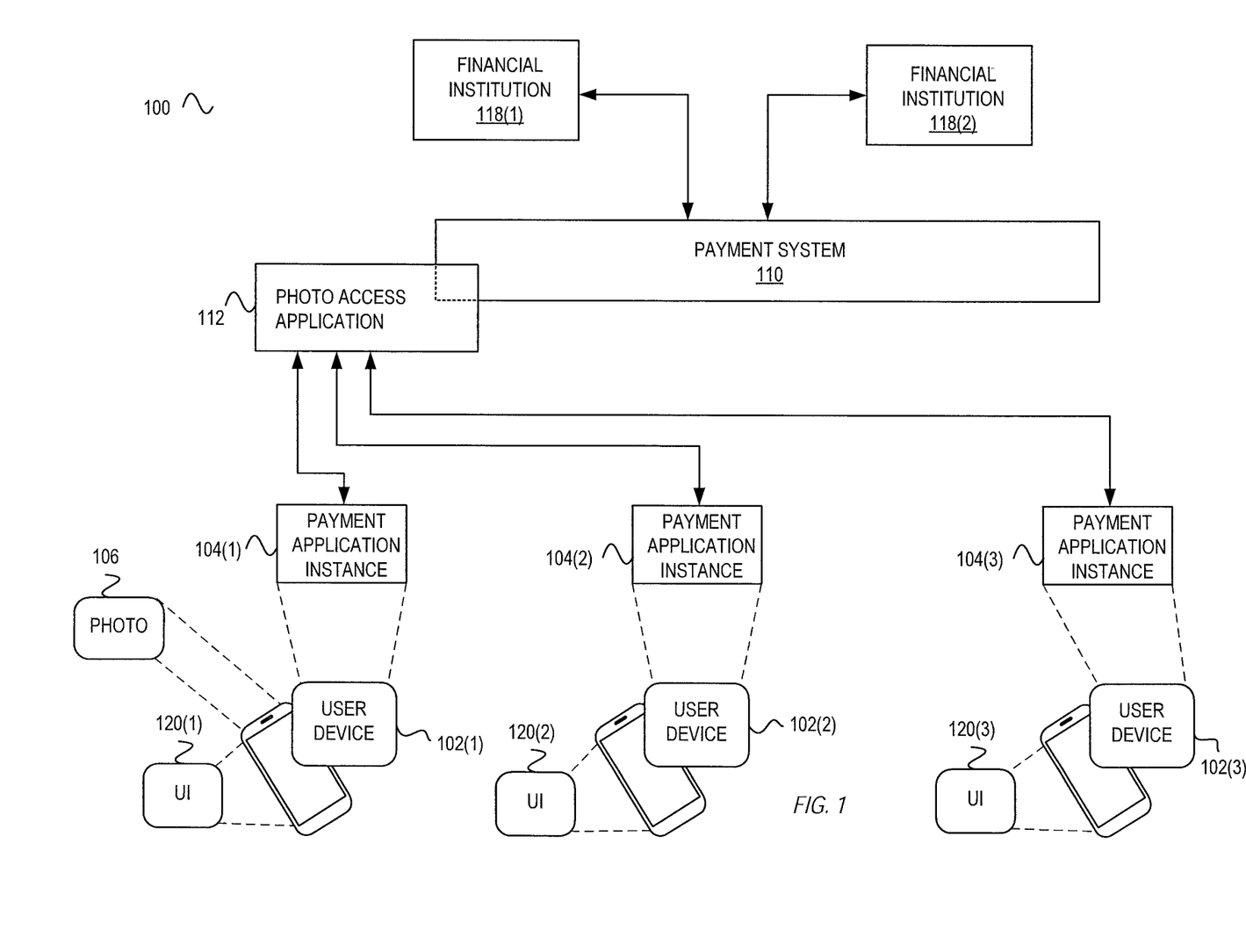
FIG. 1 is a system diagram illustrating embodiments of a communication system that includes a payment system.

FIG. 1 is a system diagram illustrating embodiments of a communication system that includes a payment system. In an overview of the system diagram 100, a user device 102(1) can access payment accounts at a payment system 110. The user device 102(1) can access a photo 106 that includes images of people. The photo 106 can be generated at the user device 102(1), such as by a user of the user device 102(1). The photo 106 can include a first image of a first person and a second image of a second person. In one embodiment, the user device 102(1) can recognize, such as by performing image processing on the photo 106, identities of the first and second persons. In another embodiment, a payment application instance 104(1) of the user device 102(1) can communicate the photo 106 to a photo access application 112 of the payment system 110 for processing.

The photo access application 112 can process the photo 106 to verify that the first image corresponds to a user of a first payment account at the payment system 110. The photo access application 112 can process the photo 106 to similarly verify that additional images correspond to other users associated with other respective payment accounts at the payment system 110. Thus, the photo access application 112 can determine the identities of the persons in the images to associate the images with appropriate payment accounts. The photo access application 112 can also communicate with the user device 102(1) and/or with the user device 102(2) to perform additional verification. If the second image is verified (e.g., using techniques described below) to be associated with the second payment account, the photo access application 112 can authorize the payment application instance 104(1) to split a payment to a third payment account (e.g., account of a merchant) between the first and the second payment accounts, or to initiate the payment to the second payment account from the first payment account.

A payment is a transfer of a certain amount of funds from a buyer to a seller. The payment can be directed from the first payment account of a buyer (e.g., the first user) to a merchant for a certain product or service provided by the merchant (e.g., the second user or the third user). The user device 102(1) can be used to access the first payment account at the payment system 110. A request to process the payment, or information about the payment, can be transmitted by the user device 102(1) along with the photo 106 to the photo access application 112. The photo access application 112 can access payment information associated with the payment, and determine the payment characteristics, including identity of the merchant. The photo access application 112 can determine a merchant payment account that is associated with the merchant. In one example, the merchant can be associated with the third user device 102(3).

For verification, the payment application instance 104(1) can communicate the photo 106 to the photo access application 112, along with any additional information such as photo location information indicating location of the device at a time the photo 106 was generated (also referred to as a photo location). The additional information can include Global Positioning System (GPS) data, or metadata, of the photo 106. Alternatively, the photo access application 112 can determine, based on the photo 106 (i.e., without receiving the photo location information), photo location that indicates a location of the user device 102(1) at the time the photo 106 was generated. For example, the photo access application 112 can perform image analysis to determine the photo location from images in the photo 106 (e.g., images of certain restaurants, landmarks, or street intersections).

The photo access application 112 can also determine a device location of the user device 102(1) at a time the user device 102(1) communicates the photo 106 to the photo access application 112. For example, the photo access application 112 can determine the device location based on data, such as GPS data, from the user device 102(1). The photo access application 112 can also determine the device location based on Internet Protocol (IP) address or another identifier associated with the communication originating at the user device 102(1). The photo access application 112 can determine the device location by triangulating the location of the user device 102(1), such as by using cellular data from the user device and/or WI-FI networks proximate to the user device 102(1).

The photo access application 112 can compare the photo location to the device location to verify the second payment account. In one embodiment, the photo access application 112 can determine whether the photo location is substantially proximate to the device location. The photo location is substantially proximate to the device location if, for example, the two locations are within a certain distance of each other. The certain distance can be predetermined, or can be calculated based on a duration of time that is lapsed between when the photo 106 was generated at the user device 102(1), and when the photo 106 is communicated to the photo access application 112. The photo access application 112 verifies the second payment account by comparing the photo location to the device location to prevent fraud, such as fraud originating from a fraudster (at some user device) using an, old photo in order to gain access to the payment accounts at the payment system 110.

The photo access application 112 can communicate with the user device 102(1) to establish additional verification of the user device 102(2) and the second payment account. For example, the payment application instance 104(1) can communicate (e.g., directly and/or via peer-to-peer communication) with the payment application instance 104(2) to establish identity of the user device 102(2) and/or a user of the user device 102(2). The photo access application 112 can independently communicate with the payment application instance 104(2) on the user device 102(2) to verify communication with the same payment application instance that is communicating with the payment application instance 104(1).

The photo access application 112 can also communicate action prompts with the payment application instance 104(1) and with the payment application instance 104(2) to establish additional verification of the user device 102(2) with the second payment account. This action prompt communication can cause the payment application instances 104(1) and/or 104(2) to display prompts for action ("action prompts") that indicate a desired action to be performed by the user(s) of the user devices 102(1) and/or 102(2), respectively. The action prompt(s) can be determined by the photo access application based on the location of each of the user devices 102(1) and 102(2), a type of payment, and/or context related characteristics, such as characteristics of the merchant, characteristics of products and/or services being purchased using the payment application instance 104(1).

For example, for a payment at a Japanese restaurant, the photo access application can determine context-related action prompts indicating that both users (i.e., of the user devices 102(1) and 102(2)) say the phrase "Sushi." Upon receiving the action prompt communication, the UI 120(1) of the user device 102(1) (and optionally the UI 120(2) of the user device 102(2)) can display a prompt for action as indicated by the action prompt communication (e.g., to say the phrase "Sushi"). Depending on a type of the user device, in some embodiments the user device 102(1) can wait a certain amount of time (e.g., one minute or another amount of time), before taking another photo of both of the users to capture actions of the users. In one embodiment, the user of the user device 102(1) can use a camera on the user device 102(1) to take another photo. In one embodiment, another device (such as a camera located on premises of the merchant where both of the users are located) can take another photo of the users to capture their actions. In one embodiment, the user device 102(1) can wait on a trigger (such as a spoken phrase, time-out, detection of a predetermined movement of one of the users) before taking another photo. The payment application instance 104(1) can then communicate the another photo to the photo access application 112 for analysis and/or additional verification.

The photo access application 112 can also determine if the user device 102(3) is associated with a third payment account at the payment system 110. If the user device 102(3) is verified to be associated with the third payment account, the photo access application 112 can authorize the payment application 104(1) and/or 104(2) to transfer funds to the third payment account. For example, photo access application 112 can authorize the payment application instance 104(1) to transfer funds from the first payment account of a first user to the merchant. The UI 120(3) of the user device 102(3) can be used by the third user to authorize the transfer of funds to the merchant.

Financial institutions 118(1) and 118(2) (collectively referred to as financial institutions 118) can provide financial services to users. The financial institutions 118 can be implemented as banks, credit unions, other deposit-taking institutions that accept and manage deposits and make loans, and other financial service providers. In some embodiments, the financial institutions 118 can include credit card networks, e.g., for funding transfer of money between users. In some embodiments, the financial institutions 118 may include a provider of purchasing power that is associated with a loyalty program. In one embodiment, the payment system 110 can access funds associated with a buyer's payment account by accessing the financial institution 118(1), and transfer these funds to a seller's payment account by accessing the financial institution 118(2).

In some embodiments, the payment application instance 104(1) can perform analysis on the captured images. The user device 102(1) generates the photo 106 that includes first and second images of first and second persons, respectively. The payment application instance 104(1) can determine, such as by applying facial recognition techniques to determine identities of the first and second persons, that the first and second images are associated with first and second payment accounts, respectively, at the payment system. The payment application instance 104(1) can determine whether the user device 102(1) has received an authorization from the payment system 110 to send a payment to, or to split the payment with, the second payment account. Responsive to determining that the user device 102(1) has received the authorization, the payment application instance 104(1) can provide a prompt for receiving a selection, via the UI 120(1), indicating whether to send a payment to the second payment account or to split the payment with the second payment account for sending to a third payment account.

In some embodiments, the photo access application 112 can perform analysis on the captured images. The photo access application 112 can access the photo 106 generated by the user device 102(1). The photo access application 112 can determine the first and second images of the first and second person in the photo 106, respectively, such as by applying facial recognition techniques to determine identities of the first and second persons. The photo access application 112 can determine that the first image (e.g., by using the determined identity) is associated with a first payment account at the payment system 110. The photo access application 112 can determine, responsive to determining that the first image is associated with the first payment account, whether the second image is associated with a second payment account (e.g., by matching the identity of the second person with the user of the second payment account). Responsive to determining that the second image is associated with the second payment account, the photo access application 112 can authorize the payment application instance 104(1) to split a payment to a third payment account between the first and second payment accounts, or to initiate sending of the payment to the second payment account. Although the examples only discuss splitting a payment between two parties, the techniques described herein can be applied to splitting the payment among multiple people. For example, the payment can be split between three friends based on two separate captured images, with the first person being with the second person in the first captured image, and with the third person in the second captured image.

Figure 2:
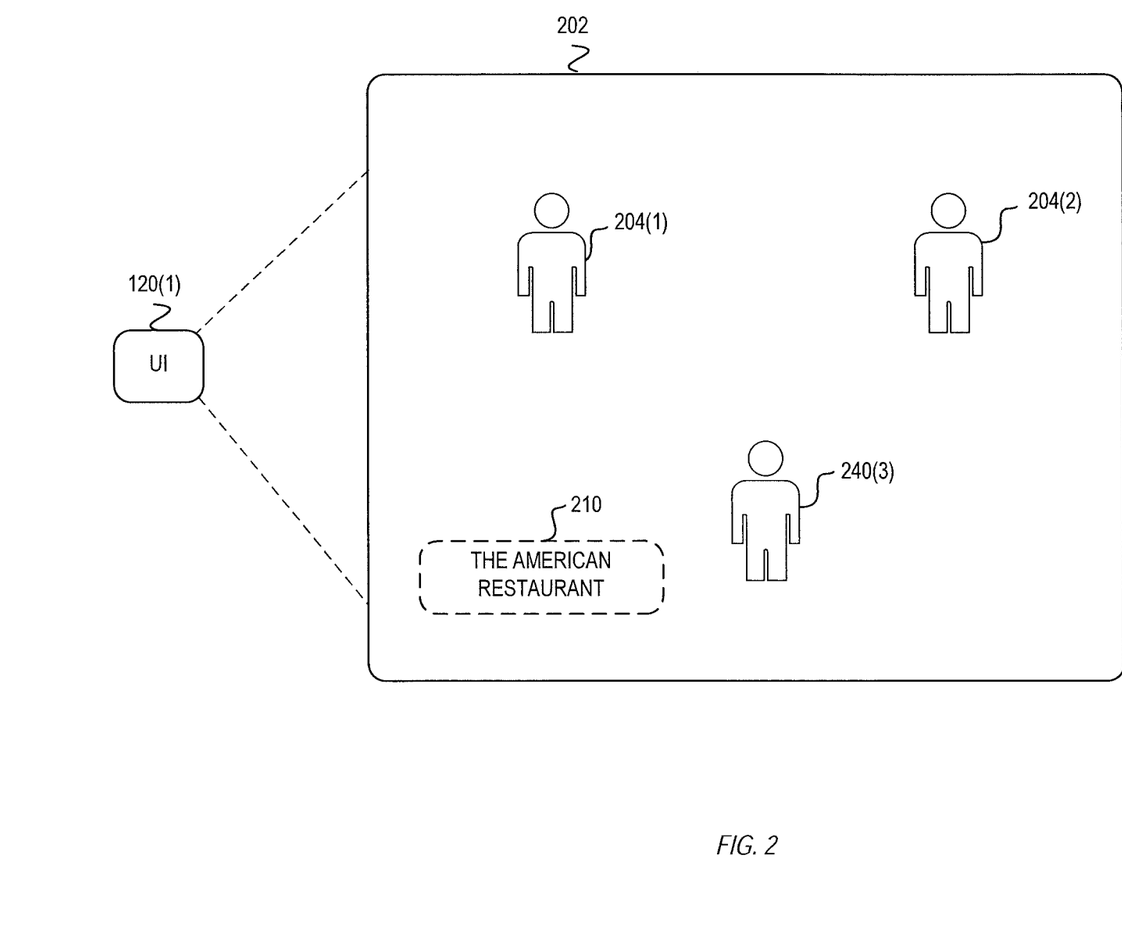
FIG. 2 is a diagram of a user interface that includes representations of persons with payment accounts at the payment system, according to some embodiments.

FIG. 2 is a diagram of a user interface that includes representations of persons with payment accounts at the payment system, according to some embodiments. FIG. 2 illustrates the UI 120(1) that can display a screen 202 with representations 204(1)-204(3) of persons indicated by the photo 106. Thus, the representation 204(1) can correspond to the image of the first person indicated by the photo 106, the representation 204(2) can correspond to the image of the second person indicated by the photo 106, and the representation 204(3) can correspond to the image of the third person indicated by the photo 106. The UI 120(1) can also display a name 210 of a merchant to which the payment is directed. FIG. 2 illustrates one example of the name 210 of the merchant of "The American Restaurant." The UI 120(1) can provide the screen 202 to prompt a user to select or confirm the UI 120(1) provided selections. The user device 102(1) can receive, via the UI 120(1), selections from the user.

For example, the UI 120(1) can display the representation 204(1) of the first person and indicate that the representation 204(1) is associated with the first payment account. Similarly, the UI 120(1) can display the representation 204(2) of the second person and indicate that the representation 204(2) is associated with the second payment account. The UI 120(1) can display the representation 204(3) of the third person and indicate that the representation 204(3) is associated with the third payment account (e.g., where the third person is an agent of the merchant). The UI 120(1) can prompt the user to confirm these associations. For example, the user device 102(1) can receive communication from the payment system 110 that causes the user device 102(1) to communicate the user device 102(3) to confirm association of the user device 102(3) with the third payment account. The communication to the user device 102(3) can cause the UI 120(3) to display a prompt for this confirmation. The user device 102(3) can send the confirmation back to the user device 102(1).

The UI 120(1) can receive user input (or communication from other user devices) confirming one or more of these associations. The UI 120(1) can receive re-assignments of these associations, such as that the second representation 204(2) is associated with the third payment account. Upon receiving the confirmation, or re-assignment, the payment application instance 104(1) can communicate each such confirmation or re-assignment to the photo access application 112.

The UI 120(1) can prompt the user to select whether to transfer funds to the second payment account associated with the second representation 204(2), or to transfer funds to the third payment account associated with the third representation 204(3). In one embodiment, the UI 120(1) can prompt the user to confirm selections determined by the photo access application 112 regarding which payment account is associated with which one of the representations 204(1)-204(3). The UI 120(1) can prompt the user to confirm which payment account is an originating payment account and which payment account is a destination payment account.

Figure 3:
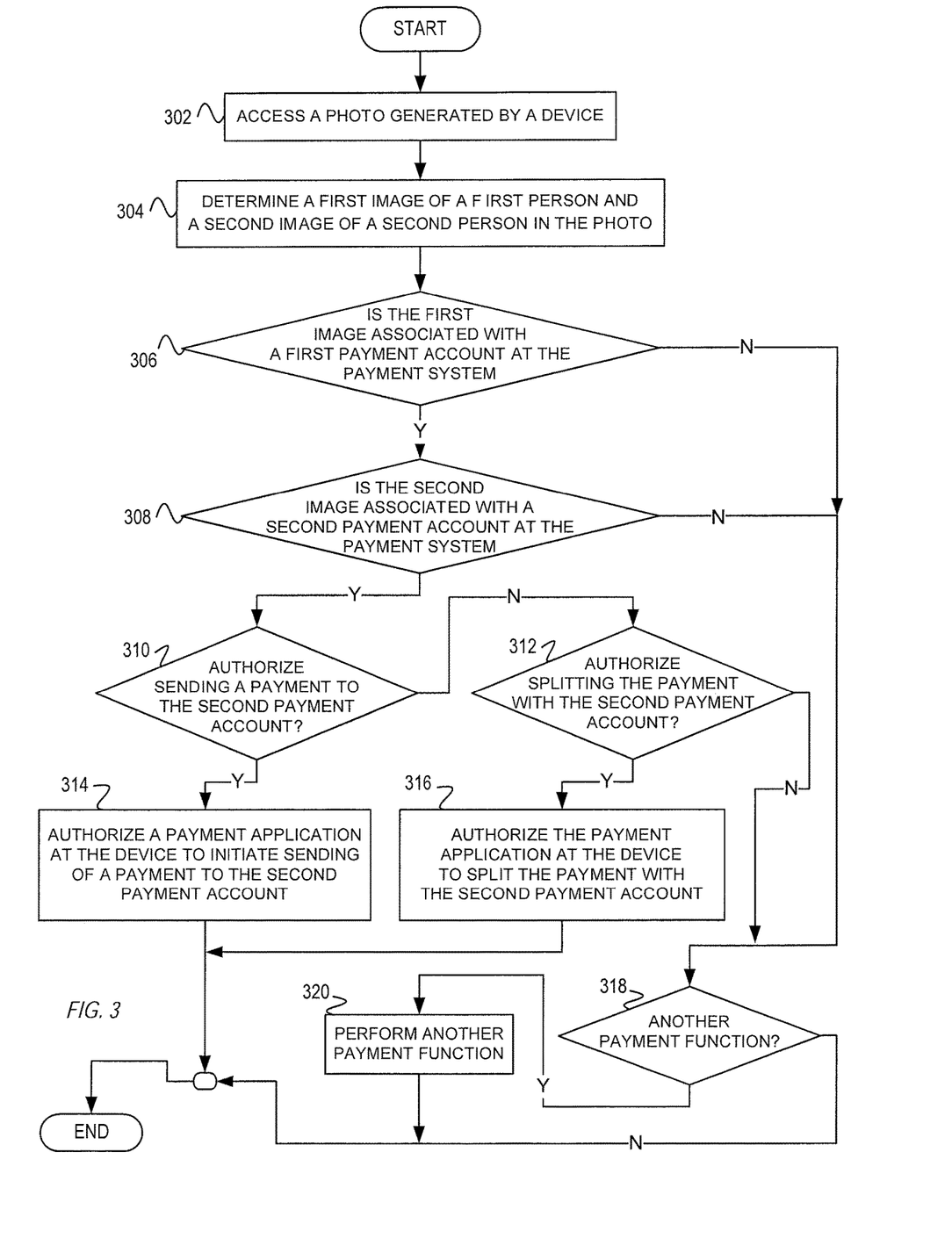
FIG. 3 is a flow diagram illustrating embodiments of operations for authorizing access to payment accounts at the payment system.

FIG. 3 is a flow diagram illustrating embodiments of operations for authorizing access to payment accounts at the payment system. The method of FIG. 3 is described with reference to the systems and components described in FIGS. 1 and 2 (for illustration purposes and not as a limitation). The example operations can be carried out by various modules of the payment system 110, such as by the photo access application 112.

Beginning with 302, the photo access application accesses a photo generated by a device. With reference to FIG. 2, the photo access application 112 can access the photo 106 that is generated by the user device 102(1).

At 304, the photo access application determines a first image of a first person and a second image of a second person in the photo. With reference to FIG. 2, the photo access application 112 can determine, in the photo 106, images of users of the user devices 102(1) and 102(2). The photo access application 112 can perform image analysis or other processing on the photo 106 to determine images of persons in the photo 106.

At 306, the photo access application determines whether the first image is associated with a first payment account at the payment system. With reference to FIG. 2, the photo access application 112 can match the first image with the first payment account. For example, the payment system 110 can store images of persons that are associated with various accounts. The photo access application 112 can match the first image with the stored images for the first payment account. The photo access application 112 can communicate with the user device 102(1) to cause the user device 102(1) to display the screen 202 on the UI 120(1) with a prompt for a selection or confirmation. The UI 120(1) can then receive the selection or confirmation that the first image is associated with the first payment account. If the photo access application 112 determines that the first image is associated with the first payment account, flow continues to 306. Otherwise, flow continues to 318.

In one embodiment, the photo access application 112 can determine that the first image does not need to be associated with the first payment account. For example, the user device 102(1) can be associated with and authorized to access the first payment account prior to the analysis of the first image. In this case, the photo 106 can only be used to detect other persons and their associated accounts. The photo 106 may only include the second and/or third images (and not anything corresponding to the first image as described above). Thus, in this embodiment, at 306 the flow may continue to 308 if the photo access application 112 determines that the first account is associated with the user device 102(1), and without determining that the first image is associated with the first payment account.

At 308, the photo access application determines whether the second image is associated with a second payment account at the payment system. Similar to element 306, the photo access application 112 can match the second image with the second payment account by matching the second image with the stored images for the second payment account. The photo access application 112 can communicate with the user device 102(1) to cause the user device 102(1) to display the screen 202 on the UI 120(1) with a prompt for a selection or confirmation of the second payment account. The UI 120(1) can then receive the selection or confirmation that the second image is associated with the second payment account.

In some embodiments, the photo access application 112 can determine a photo location that indicates a location of the user device 102(1) at a time the photo 106 was generated. For example, the photo access application 112 can determine the photo location from GPS coordinates or other location data associated with the photo 106. The photo access application 112 can also determine the photo location from the content of the photo 106, such as by determining that the photo 106 was taken at a particular restaurant. The photo access application 112 can determine a device location that indicates a location of the user device 102(1) at a time the user device 102(1) communicates the photo 106 to the photo access application 112. For example, the photo access application 112 can determine the device location from GPS coordinates associated with the communication from the user device 102(1), and/or from triangulating the location of the user device 102(1). The photo access application 112 can then compare the device location to the photo location prior to authorizing the payment application instance 104(1) to send funds to, or split funds with, the second payment account.

The photo access application 112 can also transmit action prompt communication to the user device 102(1) to cause the user device 102(1) to display, in the UI 120(1), a prompt for the first user to perform a first action. The photo access application can also transmit action prompt communication to the user device 102(2) to cause the user device 102(2) to display, in the UI 120(2), a prompt for the second user to perform a second action. The action prompt communications indicate expected actions from the users.

The photo access application 112 can access additional photo(s), such as communicated to and from the user device 102(1) and the user device 102(2). The additional photo(s) can include images of action of the first user and of the second user. The photo access application 112 can determine, such as by applying image processing algorithms, actions of the first and second users. The photo access application 112 can also access a video (e.g., generated by the user device 102(1) or 102(2)) that depicts the actions of the first and second users. The photo access application 112 can determine an action match score that indicates whether characteristics of the detected actions of the first and second user match their expected action characteristics.

The expected action characteristics are features of expected actions that relate to their associated action prompts. For example, if the action prompt for a certain expected action indicates that each user says "sushi" and/or makes a certain gesture, the expected action characteristics of expected actions may be determined from captured image or video. For this example, expected action characteristics of expected actions may be related to each user saying "sushi" and/or making that certain gesture. The photo access application 112 can compare the detected actions with the expected actions, and determine whether the detected action matches the expected action for each user. The photo access application 112 can compare the detected actions to the expected actions to generate an action match score. The action match score can be used to determine whether to authorize the payment application instance 104(1) to split the payment (or to send the payment to another account), i.e., if the action match score is higher than a threshold.

The photo access application 112 can determine the expected actions based on a variety of factors. The photo access application 112 can determine the expected actions based on the photo location, i.e., the location of the first device at the time the photo 106 was generated. The photo access application 112 can determine the expected actions based on the device location of the user device 102(1). The photo access application 112 can determine the expected actions based on payment characteristics that can indicate a type of merchant to whom the payment is to be made, or a product or service for which the payment is to be made. If the photo access application 112 determines that the second image is associated with the second payment account, flow continues to 310. Otherwise, flow continues to 318.

At 310, the photo access application 112 determines whether to authorize sending a payment to the second payment account. With reference to FIG. 1, the photo access application 112 determines whether to authorize the payment application instance 104(1) to send the payment from the first payment account to the second payment account. The photo access application 112 can determine whether the payment is directed to a merchant that is located where the photo was generated. The photo access application 112 can also determine whether the second image is associated with the merchant. The photo access application 112 can further authorize sending the payment to the second payment account based on determining that the payment is directed to the merchant that is located where the photo was generated. The photo access application 112 can further authorize sending the payment to the second payment account if the second image corresponds to (or is associated with) the merchant. If the photo access application 112 determines to authorize sending the payment to the second payment account, flow continues at 314. Otherwise, flow continues to 312.

At 312, the photo access application 112 determines whether to authorize splitting the payment with the second payment account. With reference to FIG. 1, the photo access application 112 determines whether to authorize the payment application instance 104(1) to split the payment between the first payment account and the second payment account. The photo access application 112 can determine whether the payment is directed to a merchant that is located where the photo was generated. The photo access application 112 can also determine whether the third image is associated with the merchant. The photo access application 112 can further authorize the payment application to split the payment based on determining that the payment is directed to the merchant located where the photo was generated. The photo access application 112 can further authorize the payment application to split the payment based on determining that the third image corresponds to (or is associated with) the merchant. If the photo access application 112 determines to authorize splitting the payment between the first and second payment accounts, flow continues at 316. Otherwise, flow continues to 318.

At 314, the photo access application authorizes the payment application at the first device to initiate sending of a payment to the second payment account. The photo access application 112 can communicate the authorization to the payment application instance 104(1) to initiate sending of the payment from the first payment account to the second payment account.

At 316, the photo access application authorizes the payment application at the first device to split the payment with the second payment account. The photo access application 112 can communicate the authorization to the payment application instance 104(1) to initiate splitting of the payment between the first payment account and the second payment account.

At 318, the photo access application determines whether to perform another payment function. For example, the photo access application 112 can determine certain gestures (e.g., by the first user) in the first image that indicate other payment functions. In another example, the photo access application 112 can determine that the second image is not associated with any payment account. The photo access application 112 can also determine to create a new payment account for a merchant and/or for a person associated with the second or third image. If the photo access application 112 determines to perform another payment function, flow continues at 320. Otherwise, flow ends.

At 320, the photo access application performs another payment function. If the photo access application 112 determines that the first image indicates distress by the first user, the photo access application 112 can initiate fraud detection actions and/or well as contact authorities. If the photo access application 112 deter nines a gesture corresponding to opening of an account, the photo access application 112 can initiate an operation to open a payment account.

Figure 4:
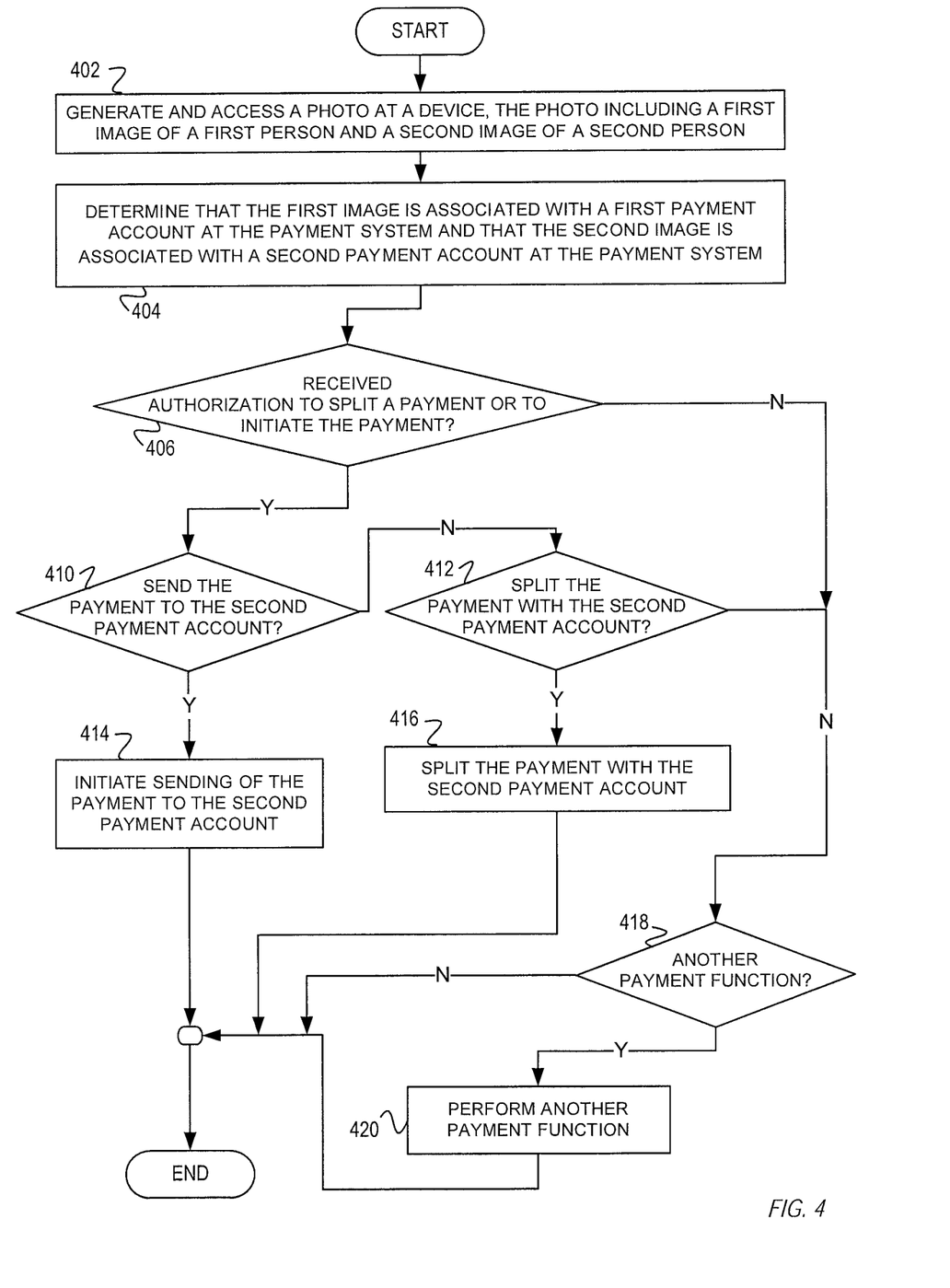
FIG. 4 is a flow diagram illustrating embodiments of operations for accessing, via a user device, payment accounts at the payment system.

FIG. 4 is a flow diagram illustrating embodiments of operations for accessing, via a user device, payment accounts at the payment system. The method of FIG. 4 is described with reference to the systems and components described in FIG. 1 (for illustration purposes and not as a limitation). The example operations can be carried out by a user device, such as by the user device 102(1).

Beginning with 402, the user device generates and accesses a photo. With reference to FIG. 2, the user device 102(1) can generate and access the photo 106. The payment application instance 104(1) of the user device 102(1) can communicate the photo 106 to the photo access application 112.

At 404, the user device determines that the first image is associated with a first image of a first person. With reference to FIG. 2, the payment application instance 104(1) at the user device 102(1) can determine, in the photo 106, images corresponding to users of the user devices 102(1). In some embodiments, the user device 102(1) can communicate with the photo access application 112, such as to provide the photo 106 for image analysis and to receive results of the image analysis. The results of the image analysis can indicate the first image and the second image. In one embodiment, based on the results of the image analysis, and additional communication from the photo access application 112, the user device 102(1) can display the screen 202 on the UI 120(1) with a prompt for a selection or confirmation. The UI 120(1) can then receive the selection or confirmation that the first image is associated with the first payment account. Similarly, the UI 120(1) can receive a selection or confirmation that the second image is associated with the second payment account. In one embodiment, the payment application instance 104(1) can receive communication from the photo access application 112 that causes the user device 102(1) to communicate with the user device 102(2) for authenticating the user device 102(2) with the second payment account.

In one embodiment, the first image does not need to be associated with the first payment account. For example, the user device 102(1) can already be associated with and authorized to access the first payment account, without the need for an image association. Furthermore, the photo 106 may only include the second and/or third images, but not the first image. Thus in this embodiment, at 406 the flow may continue to 410 if the first account is associated with the user device 102(1), and without determining that the first image is associated with the first payment account.

The payment application instance 104(1) can determine a photo location that indicates a location of the user device 102(1) at a time the photo 106 was generated. For example, the photo 106 can include GPS coordinates or other location data. The payment application instance 104(1) can determine the device location that indicates a location of the user device 102(1) at a time the user device 102(1) communicates the photo 106 to the photo access application 112.

The payment application instance 104(1) can also receive communication from the photo access application 112 that causes the user device 102(1) to display, in the UI 120(1), a prompt for the first user to perform a first action. The payment application instance 104(1) can also generate additional photo(s) (such as to capture the actions of the users), and communicate the additional photo(s) to the photo access application 112. The payment application instance 104(1) can also generate a video that depicts the actions of the first and second users.

At 406, the payment application instance determines whether it has received authorization from the payment system for sending a payment to the second payment account or for splitting the payment with the second payment account. The payment application instance 104(1) can receive the authorization via communication from the photo access application 112 of the payment system 110.

At 410, the payment application instance determines whether to send the payment to the second payment account. The payment application instance 104(1) can receive a confirmation or a selection via the UI 120(1) to send the payment to the second payment account. The payment application instance 104(1) can then communicate the confirmation or the selection to the photo access application 112. Similarly, at 412, the payment application instance determines whether to split the payment with the second payment account. The payment application instance 104(1) can receive a confirmation or a selection via the UI 120(1) to split the payment with the second payment account. The payment application instance 104(1) can then communicate the confirmation or the selection to the photo access application 112.

At 414, the payment application instance initiates sending of the payment to the second payment account. The payment application instance 104(1) can initiate the sending of the payment to the second payment account upon receiving the selection or confirmation from the user. In one embodiment, the payment access application 112 causes the user device 102(2) to provide a prompt to indicate, via the UI 120(1), that the payment is being sent to the second payment account.

At 416, the payment application instance initiates sending of the payment to the second payment account. The payment application instance 104(1) can initiate the splitting of the payment for sending to a third payment account upon receiving the selection or confirmation from the user. In one embodiment, the payment access application 112 causes the user device 102(2) to provide a prompt to indicate, via the UI 120(2), that the payment splitting is being performed.

At 418, the payment application instance determines whether to perform another payment function. The user device 102(1) can receive requests for additional confirmation and/or selections from the photo access application 112. If the payment application instance 104(1) determines to perform another payment function, flow continues at 420. Otherwise, flow ends. At 420, the payment application instance performs another payment function. For example, if the photo access application 112 determines a gesture corresponding to opening of an account, the payment application instance 104(1) can receive communication that causes the UI 120(1) to initiate opening of a payment account.

Figure 5:
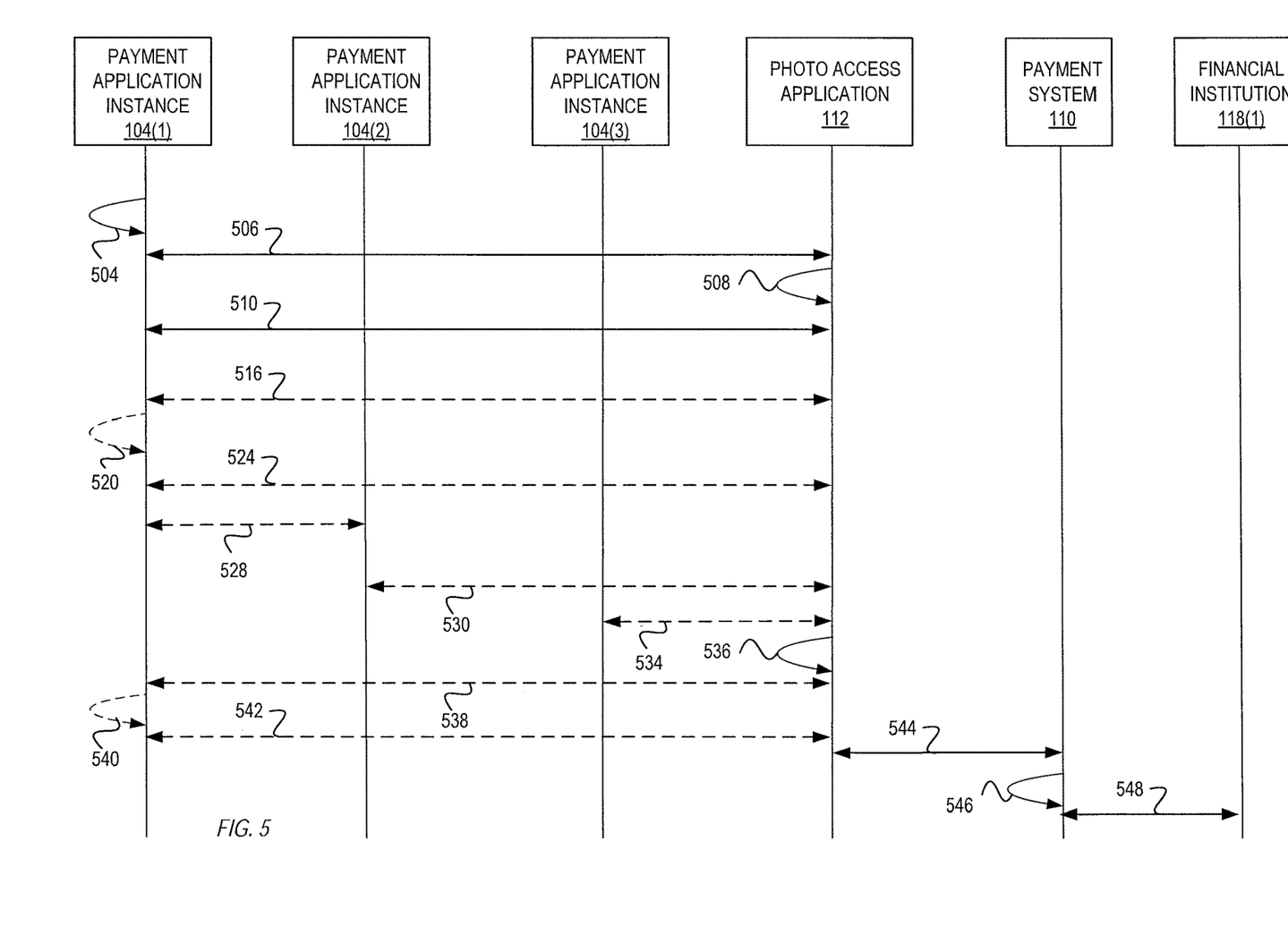
FIG. 5 is a timing diagram illustrating embodiments of communication between various modules of a payment system communicating with user devices when accessing accounts at the payment system via photos.

FIG. 5 is a timing diagram illustrating embodiments of communication between various modules of a payment system communicating with user devices when accessing payment system accounts via photos. The communications of FIG. 5 can be performed over one or more communication networks, such as shown by FIG. 1. Portions of the timing diagram of FIG. 5 correspond to the flow diagrams of FIGS. 3 and 4.

At 504, the payment application instance 104(1) can access a photo generated at the user device. At 506, the payment application instance 104(1) can communicate the photo to the photo access application 112. At 508, the photo access application 112 can determine that a first image in the photo is associated with a first payment account at the payment system 110. At 510, the photo access application 112 communicates to the payment application instance 104(1) that the first image is associated with the first payment account.

At 516, the photo access application 112 optionally communicates action prompts to the payment application instance 104(1), and optionally with the payment application instance 104(2), to establish additional verification (not shown). At 520, the payment application instance 104(1) can generate an additional photo and/or video to capture actions of the users. At 524, the payment application instance 104(1) can communicate the additional photo and/or video to the photo access application 112 for additional analysis. At 528, the payment application instance 104(1) can communicate with the payment application instance 104(2) to perform additional verification. At 530, the payment application instance 104(2) can communicate with the photo access application 112 to perform additional verification, such as to verify that the user device 102(2) hosting the payment application instance 104(2) is in proximate location of, and/or in receipt of communication with, the user device 102(1) hosting the payment application instance 104(1).

At 534, the payment application instance 104(3) can communicate with the photo access application 112 to perform additional verification, such as to verify that the payment application instance 104(3) is the merchant for receiving the payment from the payment application instance 104(1). At 536, the photo access application 112 determines that the second image is associated with the second payment account. At 538, the photo access application 112 can provide authorization to the payment application instance 104(1) to initiate the payment to the second payment account from the first payment account, or to split the payment between the first payment account and the second payment account to the third payment account. At 540, the photo access application instance 104(1) can receive a selection or confirmation from the UI of the user device 102(1).

At 542, the payment application instance 104(1) can communicate the selection or confirmation to the photo access application 112. At 544, the photo access application 112 communicates with the payment system 110 for processing the payment. At 546, the payment system 110 processes the payment. At 548, the payment system 110 can access the financial institution 118(1), such as to affect a balance of a financial account at the financial institution 118(1).

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 3 and 4 may be omitted, described in a different sequence, or combined as desired or appropriate.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of foams, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flow diagram illustrations and/or block diagrams of methods, apparatus (systems) and computer program products according to embodiments of the inventive subject matter. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
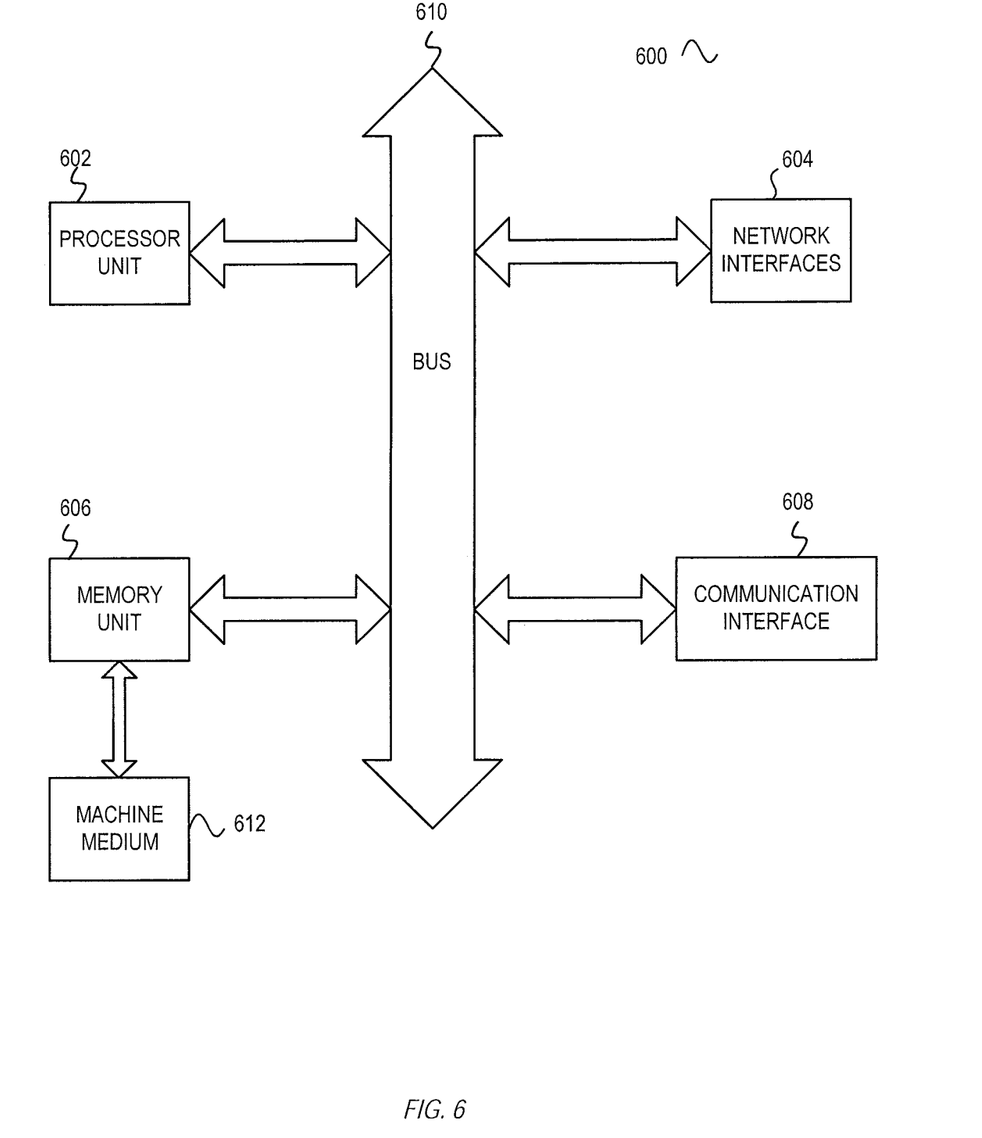
FIG. 6 is a block diagram of one embodiment of an electronic device used in the communication system of FIGS. 1 and 5.

FIG. 6 is a block diagram of one embodiment of an electronic device used in the communication systems of FIGS. 1 and 5. In some implementations, the electronic device 600 may be one of a laptop computer, a tablet computer, a mobile phone, a powerline communication device, a smart appliance (PDA), a user device, a server, or another electronic system. The electronic device 600 can include processor unit 602 (possibly including multiple processors, multiple cores, multiple nodes, and/or implementing multi-threading, etc.). The electronic device 600 can also include memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The electronic device 600 includes a communication interface 608 for network communications. The communication interface 608 can include at least one of a wireless network interface (e.g., a WLAN interface, a Bluetooth interface, a WiMAX interface, a ZigBee interface, a Wireless USB interface, etc.). In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that facilitate accessing payment system accounts via photos. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interfaces 604, and the communication interface 608 are coupled to the bus 610. Although illustrated as being coupled to the bus 610, the memory unit 606 may be coupled to processor unit 602.

While the embodiments are described with reference to various implementations and exploitations, it will be understood that these embodiments are illustrative and that the scope of the inventive subject matter is not limited to them. In general, techniques for managing accessing payment system accounts via photos as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of using a device to access multiple payment accounts at a payment system via photos, the method comprising:
   accessing, by the payment system, an image that was generated by a first device;
   determining, by the payment system, a first sub-image of a first person in the image, a second sub-image of a second person in the image, and a third sub-image of a third person in the image;
   storing, by the payment system, images for a first payment account, a second payment account, and a third payment account;
   determining, by the payment system, that the first sub-image is associated with the first payment account at the payment system by matching the first sub-image with the stored images for the first payment account;
   determining, by the payment system, that the second sub-image is associated with the second payment account at the payment system by matching the second sub-image with the stored images for the second payment account;
   determining, by the payment system, that the third sub-image is associated with the third payment account at the payment system by matching the third sub-image with the stored images for the third payment account;
   obtaining, by the payment system, metadata from the image, wherein the metadata includes a time when the image was generated by the first device and a location where the image was generated by the first device;
   based on the time corresponding to when the image was generated by the first device and a time corresponding to the accessing the image generated by the first device, calculating, by the payment system, a maximum distance that the first device can be separated from the location where the image was generated by the first device;
   determining, by the payment system, a location of the first device based on Global Positioning System (GPS) data retrieved from the first device;
   based on the location of the first device, verifying, by the payment system, that the first device is within the maximum distance from the location where the image was generated by the first device; and
   authorizing, by the payment system, a payment application at the first device to split the payment between the first payment account and the second payment account and provide the payment from the first payment account and the second payment account to the third payment account.

2. The method of claim 1, further comprising:
   transmitting, by the payment system, a communication to the first device to cause the first device to display, in a user interface of the first device, a prompt for a first user to perform a first action; and
   transmitting, by the payment system, a communication to a second device to cause the second device to display, in a user interface of the second device, a prompt for a second user to perform a second action.

3. The method of claim 2, further comprising:
   determining, by the payment system, one or more payment characteristics of the payment; and
   determining, by the payment system, the first action and the second action based on the location where the image was generated and the one or more payment characteristics.

4. The method of claim 3, wherein the third payment account comprises a merchant account, and wherein the determining the first action and the second action is based on a type of the merchant account.

5. The method of claim 4, wherein the type of the merchant account is a restaurant account, and wherein the first action and the second action are audibly saying an item on a menu at a restaurant associated with the restaurant account.

6. The method of claim 2, further comprising:
   accessing, by the payment system, an image indicating an action of the first user;
   accessing, by the payment system, an image indicating an action of the second user; and
   determining, by the payment system, an action match score that indicates whether characteristics of the action of the first user and characteristics of the action of the second user match expected characteristics for the action of the first user and expected characteristics for the action of the second user, respectively,
   wherein said authorizing the payment application is determined, at least in part, based on the action match score.

7. The method of claim 1, further comprising:
   transmitting, by the payment system, a communication to the first device indicating that the first sub-image and the second sub-image are associated with the first and second payment accounts, respectively, for paying the payment, and that the third sub-image is associated with the third payment account for receiving the payment.

8. The method of claim 1, further comprising:
   transmitting, by the payment system, a communication to the first device causing a user interface on the first device to display a request for a selection of the second sub-image or the third sub-image as being associated with the third payment account; and
   receiving, by the payment system, a response from the first device selecting the third sub-image being associated with the third payment account, wherein said authorizing the payment application is based on determining that the third sub-image is associated with a merchant.

9. A payment system, comprising:
   a non-transitory memory storing instructions; and
   a processor configured to execute the instructions to cause the payment system to:
   access an image that was generated by a first device;
   determine a first sub-image of a first person in the image, a second sub-image of a second person in the image, and a third sub-image of a third person in the image;

store images for a first payment account, a second payment account, and a third payment account;

determine that the first sub-image is associated with the first payment account at a payment system by matching the first sub-image with the stored images for the first payment account;

determine that the second sub-image is associated with the second payment account at the payment system by matching the second sub-image with the stored images for the second payment account;

determine that the third sub-image is associated with the third payment account at the payment system by matching the third sub-image with the stored images for the third payment account;

obtain metadata from the image, wherein the metadata includes a time when the image was generated by the first device and a location where the image was generated by the first device;

based on the time corresponding to when the image was generated by the first device and a time corresponding to the accessing the image generated by the first device, calculate a maximum distance that the first device can be separated from the location where the image was generated by the first device;

determine a location of the first device based on geo-location data retrieved from the first device;

based on the location of the first device, verify that the first device is within the maximum distance from the location where the image was generated by the first device; and authorize a payment application on the first device to split the payment between the first payment account and the second payment account and transfer the split amount from the first payment account and the second payment account to the third payment account.

10. The payment system of claim 9, wherein the third payment account is a merchant account associated with a location where the image was generated.

11. The payment system of claim 9, wherein executing the instructions further causes the payment system to:

transmit a communication to the first device to cause the first device to display, in a user interface of the first device, a prompt for a first user to perform a first action; and transmit a communication to a second device to cause the second device to display, in a user interface of the second device, a prompt for a second user to perform a second action.

12. The payment system of claim 11, wherein executing the instructions further causes the payment system to:

determine one or more payment characteristics of the payment; and determine the first action and the second action based on the location where the image was generated and the one or more payment characteristics.

13. The system of claim 12, wherein the determining the first action and the second action is based on a type of merchant of the third payment account.

14. The system of claim 13, wherein the type of merchant is a restaurant type, and wherein the first action and the second action are audibly saying an item on a menu at a restaurant associated with the third payment account.

15. The system of claim 11, wherein executing the instructions further causes the payment system to:

access a second image indicating an action of the first user;

access a third image indicating an action of the second user; and determine an action match score that indicates whether characteristics of the action of the first user and characteristics of the action of the second user match expected characteristics for the action of the first user and expected characteristics for the action of the second user, respectively, wherein authorizing the payment application is based on the action match score exceeding a threshold.

16. A non-transitory machine-readable medium having instructions stored thereon, the instructions executable to cause a payment system to perform operations comprising:

accessing an image that was generated by a first device;

determining a first sub-image of a first person in the image, a second sub-image of a second person in the image, and a third sub-image of a third person in the image;

accessing stored images for a first payment account, a second payment account, and a third payment account;

determining that the first sub-image is associated with the first payment account at a payment system by matching the first sub-image with the stored images for the first payment account;

determining that the second sub-image is associated with the second payment account at the payment system by matching the second sub-image with the stored images for the second payment account;

determining that the third sub-image is associated with the third payment account at the payment system by matching the third sub-image with the stored images for the third payment account;

obtaining metadata from the image, wherein the metadata includes a time when the image was generated by the first device and a location where the image was generated by the first device;

based on the time corresponding to when the image was generated by the first device and a time corresponding to the accessing the image generated by the first device, calculating a maximum distance that the first device can be separated from the location where the image was generated by the first device;

determining a location of the first device based on geo-location data retrieved from the first device;

based on the location of the first device, verifying that the first device is within the maximum distance from the location where the image was generated by the first device; and authorizing a payment application on the first device to send the payment from the first payment account and the second payment account to a third payment account.

17. The non-transitory machine-readable medium of claim 16, wherein the third payment account is a merchant account that is associated with the location where the image was generated.

18. The non-transitory machine-readable medium of claim 16, wherein the operations further comprise:

transmitting a communication to the first device to cause the first device to display, in a user interface of the first device, a prompt for a first user to perform a first action; and transmitting a communication to a second device to cause the second device to display, in a user interface of the second device, a prompt for a second user to perform a second action.

19. The non-transitory machine-readable medium of claim 18, wherein the operations further comprise:
   determining one or more payment characteristics of the payment; and
   determining the first action and the second action based on the location where the image was generated and the one or more payment characteristics.

20. The non-transitory machine-readable medium of claim 19, wherein the determining the first action and the second action is based on a type of merchant of the third payment account.

* * * * *

UNITED STATES PATENT AND TRADEMARK OFFICE
CERTIFICATE OF CORRECTION

PATENT NO.         : 11,100,489 B2
APPLICATION NO.    : 15/421160
DATED              : August 24, 2021
INVENTOR(S)        : Elliot Michael Lee and George Carpenter Page 1 of 1

It is certified that error appears in the above-identified patent and that said Letters Patent is hereby corrected as shown below:

In the Specification

At Column 9, Line 56: Please replace "deter nines" with "determines"

At Column 13, Line 15: Please replace "foams" with "forms"

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*